United States Patent [19]
Thompson

[11] 3,921,402
[45] Nov. 25, 1975

[54] THERMAL ACTUATOR
[75] Inventor: Paige W. Thompson, Morrison, Ill.
[73] Assignee: General Electric Company, Fort Wayne, Ind.
[22] Filed: May 28, 1974
[21] Appl. No.: 473,764

[52] U.S. Cl. ............... 60/531; 236/68 A; 236/99 R; 73/368.4
[51] Int. Cl.² ......................................... F03G 7/06
[58] Field of Search .................... 60/531; 236/68 A; 73/368.4

[56] References Cited
UNITED STATES PATENTS

| | | | |
|---|---|---|---|
| 1,952,733 | 3/1934 | Smith | 60/531 X |
| 2,187,124 | 1/1940 | Harmon | 60/531 X |
| 2,867,974 | 1/1959 | Wenander | 60/531 |
| 3,604,822 | 9/1971 | Saxe | 60/531 X |

FOREIGN PATENTS OR APPLICATIONS

| | | | |
|---|---|---|---|
| 622,768 | 11/1935 | Germany | 236/68 A |
| 632,673 | 6/1936 | Germany | 236/68 A |
| 1,064,267 | 8/1959 | Germany | 236/68 A |
| 108,628 | 1939 | Australia | 60/531 |

*Primary Examiner*—Martin P. Schwadron
*Assistant Examiner*—H. Burks, Sr.
*Attorney, Agent, or Firm*—Joseph E. Papin

[57] ABSTRACT

A thermal actuator has means for containing a vaporizable fluid, and the containing means is heated and cooled to effect displacement and return flows of the fluid, respectively. Means is provided to vaporize returning fluid to throttle the volumetric flow rate thereof.

There is also disclosed other thermal actuators methods of operating a thermal actuator, actuating systems for a thermal actuator, and an electrical circuit for a thermal actuator.

47 Claims, 2 Drawing Figures

THERMAL ACTUATOR

CROSS-REFERENCE TO RELATED APPLICATIONS

This application is related to patent applications Ser. Nos. 433,593 and 433,594 filed Jan. 15, 1974, respectively and to patent application Ser. No. 439,894 filed Feb. 6, 1974 which are specifically incorporated herein by reference.

BACKGROUND OF THE INVENTION

This invention relates generally to actuators and in particular to a thermal actuator, methods of operating such, actuating systems therefor, and an electrical circuit for controlling a thermal actuator.

In the past, various thermal actuators have been employed in different actuating systems for operating various devices, such as electrical switches, fluid pressure control valves, and sequencers for controlling electrical switches and/or electrically actuated fluid pressure control valves or the like. One of the disadvantageous or undesirable features of the past thermal actuators and actuating systems therefor is believed to be that, in many cases, they reset too quickly, i.e. the cooling cycles of the past thermal actuators occurred over a very short time interval; therefore, it was difficult to properly sequence the off period of devices actuated by such thermal actuators. Another disadvantageous or undesirable feature of some of the past thermal actuators and systems that normally had long reset times for sequencing the off period is believed to be that they lacked the ability to be used as a safety control for use under emergency conditions, such as a power failure or an over-heating condition or the like. Under these conditions, a fast off period is desired.

SUMMARY OF THE INVENTION

Among the several objects of the present invention may be noted the provision of a thermal actuator, methods of operating a thermal actuator, actuating systems for a thermal actuator and an electrical circuit for operating a thermal actuator which overcome the disadvantageous or undesirable features discussed hereinbefore, as well as others, with respect to the prior art; the provision of such thermal actuator, methods, actuating systems, and electrical circuit that provide a predetermined time delay between operating stages or states during a resetting time period; the provision of such thermal actuator, methods, actuating system, and electrical circuit having a normally long reset, but having a quick reset or "off" in the event that emergency conditions occur, such as a power failure or over-heating conditions or the like; and the provision of such thermal actuator, actuating system and electrical circuit which are simplistic in design and operation, economically manufactured, and easily assembled. These as well as other objects and advantageous features of the present invention will be in part apparent and in part pointed out hereinafter.

In general a thermal actuator in one form of the invention has means for containing a vaporizable fluid, and the containing means is adapted to be heated and cooled for effecting displacement flow and return flow of the fluid, respectively. Means is provided for vaporizing at least a portion of the fluid during the return flow thereof to throttle the volumetric flow rate of the returning fluid.

Also in general, a thermal actuator in one form of the invention has a pair of means for containing a vaporizable fluid, and means associated with one of the containing means is operable generally between energized and de-energized states for creating pressure differentials between the containing means to establish flows of the fluid in opposite directions therebetween upon the occurrence of certain conditions, respectively. Means is provided for vaporizing at least a portion of the fluid as it flows from the other of the containing means toward the one containing means when the creating means is in its de-energized state.

Further and in general, a method in one form of the invention is provided for operating a thermal actuator having a pair of means for containing vaporizable fluid. In this operating method heating and cooling of one of the containing means is controlled for respectively effecting transfer of fluid therein to the other of the containing means and the return therefrom of fluid to the one containing means. At least a portion of the fluid during its return to the one containing means, is vaporized for throttling the volumetric flow rate thereof.

Also in general, another method in one form of the invention is provided for operating a thermal actuator having means therein for containing a vaporizable fluid. In this operating method, the containing means is heated and cooled for effecting the operation of the thermal actuator, and means for accelerating the cooling of the containing means is communicated with it upon the occurrence of a certain condition.

Further and in general, an actuating system in one form of the invention is provided for a thermal actuator having a pair of means for containing a vaporizable fluid and a device is operably associated for actuation with one of the containing means. Means for effecting heating and cooling of the other of the containing means is provided to respectively establish displacement flow of the fluid therein to the one containing means to effect the actuation of the device and return flow of the fluid from the one containing means to effect the de-actuation of the device and means is provided for vaporizing at least a portion of the fluid during the return flow to throttle the volumetric rate thereof and delay the de-actuation of the device.

Still further and in general, another actuating system in one form of the invention includes a thermal actuator having means for containing a vaporizable fluid. Means is operable generally between energized and de-energized states for respectively effecting heating and cooling of the containing means, and means is provided for engagement with the containing means to accelerate the cooling thereof upon the occurrence of a certain condition.

Still further and in general, an electrical circuit in one form of the invention for operating a thermal actuator is provided with means for heating at least a portion of the thermal actuator and means for selectively connecting the heating means in the circuit. A heat sink is also provided, and means is operable generally in response to interruption of the circuit for communicating the heat sink and the thermal actuator portion.

Also in general, a method in one form of the invention is provided for operating a thermal actuator having a pair of means for containing a vaporizable fluid. In this operating method, heating of one of the containing means is effected to create a pressure differential between the containing means and establish displacement flow of at least a portion of the fluid toward the other of the containing means. The one containing means is then permitted to cool relative to the other containing means to create another pressure differential between the containing means and establish a return flow of the fluid from the other containing means toward the one containing means. At least a part of the fluid is vaporized during its return flow, and at least a part of the latent heat of evaporation of the return flow of the fluid so vaporized is surrendered to the one containing means to slow the cooling rate thereof.

Further in general, a thermal actuator in one form of the invention has a pair of means for containing a vaporizable fluid and also means for communicating the containing means. Means is operable generally for heating one of the containing means to establish a displacement flow of at least a part of the fluid therefrom through the communicating means toward the other of the containing means, and the heating means is operable to thereafter at least reduce the heating of the one containing means relative to the other containing means to establish a return flow of fluid from the other containing means through the communicating means toward the one containing means. Means is disposed in thermal transfer relation with the communicating means for vaporizing at least a part of the return flow of the fluid therethrough to throttle the volumetric flow rate of the return flow of the fluid.

More particularly but still in general, a thermal actuator in one form of the invention has a boiler with a chamber therein adapted to contain a vaporizable fluid. Means for performing work includes a bellows having an expansible chamber therein adapted to be generally filled with the fluid, and a wall on the bellows is responsive to the pressure of the fluid in the expansible chamber to effect the performance of the work. A conduit is connected between the boiler and the bellows for communicating the first named chamber and the expansible chamber. Means is operable generally between energized and de-energized states for effecting heating and cooling of the boiler relative to the bellows thereby to create pressure differentials in opposite directions between the first named chamber and the expansible chamber, respectively. The pressure differential in one of the opposite directions initially created upon the heating of the boiler is effective to establish a displacement flow of at least a part of the fluid from the boiler through the conduit to the expansible chamber increasing the pressure of the fluid therein to effect the work performance of the bellows wall. Thereafter, the pressure differential in the other of the opposite directions created upon the subsequent cooling of the boiler is effective to establish a return flow of the fluid from the bellows through the conduit toward the boiler reducing the pressure of the fluid in the expansible chamber for generally effecting termination of the work performance of the bellows wall. Means is disposed in heat transfer relation with the conduit for vaporizing at least a part of the fluid during its return flow to throttle the volumetric flow rate thereof and thereby delay the reduction of the pressure of the fluid in the expansible chamber and the termination of the work performance of the bellows wall.

BRIEF DESCRIPTION OF THE DRAWINGS

Corresponding reference characters indicate corresponding parts throughout the several views of the drawings.

Figure 1:
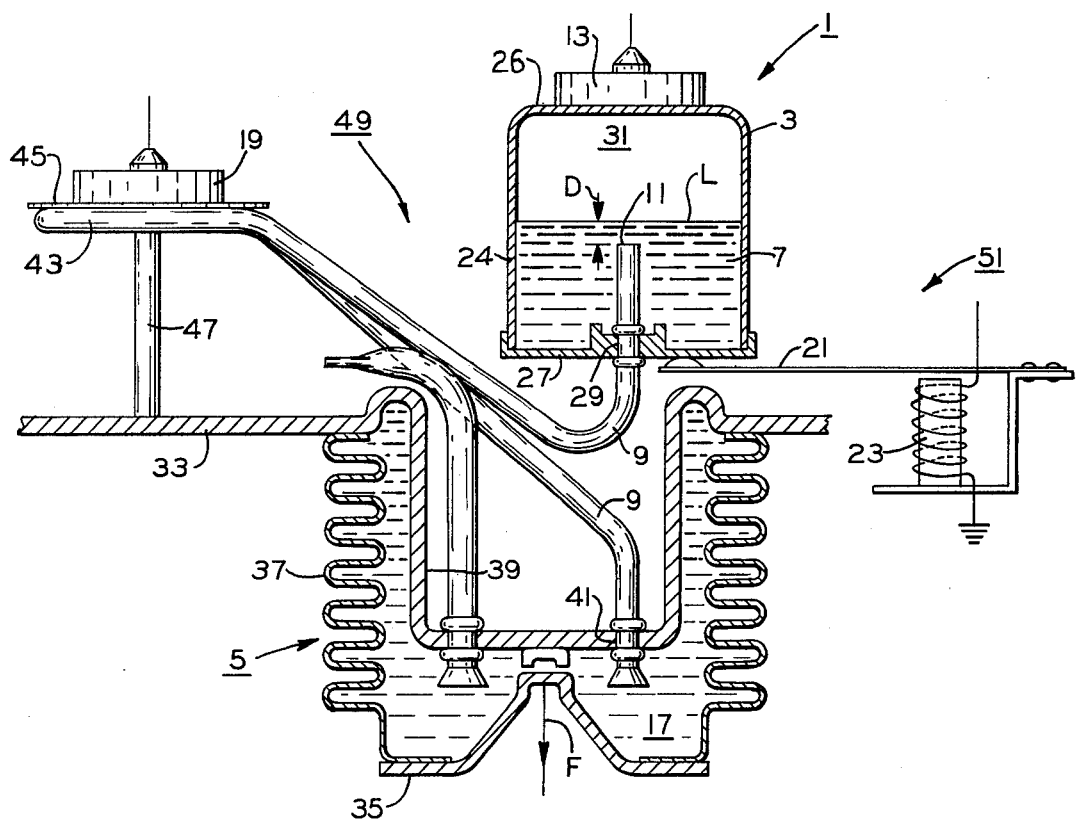
FIG. 1 is a partial sectional view illustrating a thermal actuator and a system for actuating such, each in one form of the invention, and teaching principles of methods for operating a thermal actuator also in one form of the invention.

The following examples illustrate the invention and are not to be construed as limiting in any manner.

DETAILED DESCRIPTION OF THE PREFERRED EMBODIMENTS

Referring now the drawings in general, there is illustrated a method in one form of the invention of operating a thermal actuator 1 having a pair of means, such as a boiler or bulb 3 and an expansible bellows 5, for containing a vaporizable fluid 7, such as an alcohol or other suitable vaporizable fluids well known in the art. In this operating method, one of the containing means or boiler 3 is heated and then cooled for respectively effecting transfer of fluid 7 therein to the other of the containing means or bellows 5 and the return therefrom of the fluid to the boiler. Vaporization of at least a portion of fluid 7 returning to boiler 3 is effected for throttling the volumetric flow rate thereof.

More particularly means, such as a conduit or tube 9 or the like, for transferring or carrying fluid 7 is disposed between boiler 3 and bellows 5 communicating them, and an upper or open end portion 11 of the conduit is disposed space or distance D beneath a preselected fill level L of the fluid in the boiler. Fill level L of fluid 7 in boiler 3 is less than the capacity of the boiler and may be of any desired level therein above upper end portion 11 of conduit 9. The actual depth of selected distance D is critical with respect to determining the amount of fluid 7 in its liquid state it is desirable to initially displace from boiler 3 to bellows 5 while thereafter transferring only vapors of the remaining fluid in the boiler. In other words, the initial displacement of fluid 7 in its liquid state is very rapid and may be utilized to very quickly establish a bellows working force F for driving a driven device, such as a sequencer, switch or valve (not shown), and the magnitude of such initial, quickly established working force F may also be predetermined by selecting the proper amount of fluid for initial displacement in its liquid state. While boiler 3 and bellows 5 of thermal actuator 1 are shown and discussed for purposes of disclosure, it is contemplated that other types of boilers, bellows and thermal actuators may be utilized within the scope of the invention so as to generally conform with its attendant objects and advantageous features.

Figure 2:
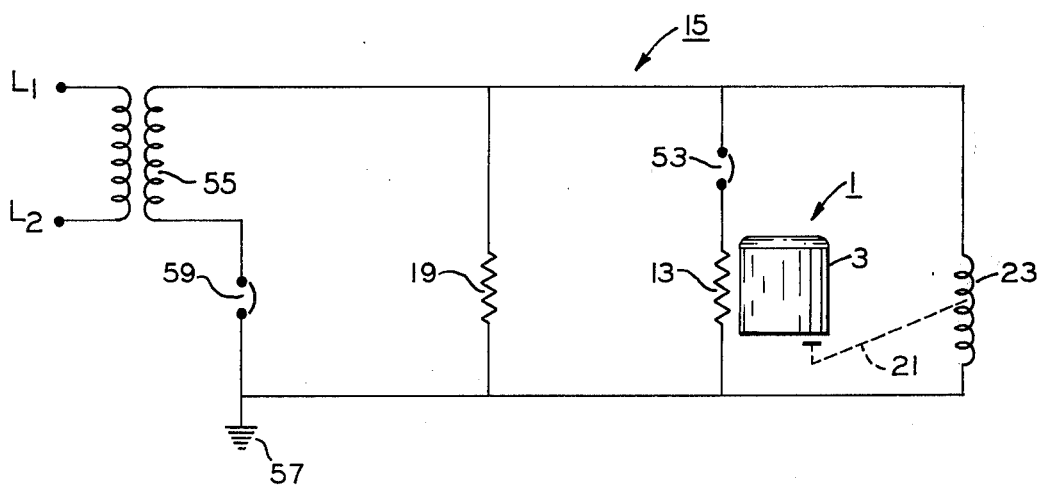
FIG. 2 is a schematic diagram illustrating an electrical circuit in one form of the invention for operating the thermal actuator.

Vaporization of fluid 7 in boiler 3 may be accomplished by energization of any suitable heating means thermally associated in heat transfer relation with the boiler, as well known in the art, and for this purpose, a positive temperature coefficient resistor (PTCR) 13 is conductively disposed in heat exchange relation with the boiler and connected in an electrical circuit 15, as shown in FIG. 2 and discussed hereinafter. Energization of PTCR 13 conductively heats boiler 3 and fluid 7 therein to a temperature effecting vaporization of the fluid which is accompanied by a corresponding increase in pressure in boiler 3 and a pressure differential between the boiler and bellows 5. The pressure so created in boiler 3 by the vapors established therein initially and relatively rapidly displaces fluid 7 in its liquid state above upper end portion 11 of conduit 9 through a passage therein (not shown) into an expansible chamber 17 of the bellows 5. When the initial displacement of the selected portion of fluid 7 in its liquid state reduces the level of the fluid in boiler 3 from predetermined fill level L to a level at least generally coextensive with upper end portion 11 of conduit 9, i.e. by the distance D, then only vapor effected upon further vaporization of the remaining fluid in the boiler is subsequently transferred through the conduit to the bellows. Of course, the rate of displacement of fluid 7 in its liquid state is greater than the rate of transfer of vapor, and the vapor transferred or otherwise conducted through conduit 9 to bellows 5 is condensed in the relatively cooler environs thereof further increasing the bellow's output force F.

During reset operation of thermal actuator 1 in response to a certain or preselected condition, PTCR 13 reverts to its de-energized state to terminate heating of boiler 3, and the boiler begins to cool effecting condensation of a slight amount of vapor therein which results in a corresponding slight decrease in pressure in the boiler. Upon this slight decrease in pressure, a pressure differential is created between boiler 3 and bellows 5 to establish a return flow of fluid 7 through conduit 9 from the bellows to the boiler in an attempt to equalize the pressure therebetween. However, it may be noted that a suitable heating means, such as a positive temperature coefficient resistor (PTCR) 19, is conductively or thermally associated in heat transfer relation with conduit 9 and connected in electrical circuit 15 for energization to vaporize at least a portion of the return flow of fluid 7 from bellows 5 to boiler 3. Of course, such vaporization of returning fluid 7 throttles or reduces the volumetric flow rate thereof thereby to generally delay the resetting or off period of thermal actuator 1 and the reduction of the bellows output force F. The volumetric flow rate of returning fluid 7, which is vaporized by PTCR 19, is reduced due to the restrictive flow of vapor in conduit 9 and the length of time necessary for the vapor of the returning fluid to be condensed in boiler 3. It may be noted that upon return of vaporized fluid 7 to boiler 3, the vaporized fluid surrenders its latent heat of vaporization to the boiler in order to slow or decrease the cooling rate thereof. In this manner, vaporization of the returning flow of fluid 7 acts generally to maintain a pressure differential between boiler 3 and bellows 5 generally at a low value proportional to the cooling rate of the boiler, and the volumetric flow rate of the returning flow of the fluid to the boiler is also generally proportional to the cooling rate thereof. As condensation of returning fluid 7 in its vaporized state continues in boiler 3, the pressure differential and working force F are correspondingly reduced and eventually eliminated. Thus, the flow rate of returning fluid 7 is a function of the pressure differential, the latent heat of vaporization of the fluid, the restrictive flow of the fluid through conduit 9, and the cooling rate of boiler 3.

There is also illustrated another method in one form of the invention for operating thermal actuator 1 which is provided with means, such as boiler 3, for containing vaporizable fluid 7. In this operating method, heating and cooling of boiler 3 effects operation of thermal actuator 1, as previously described hereinabove, and means, such as a heat sink 21, for accelerating the cooling of the boiler is communicated with it upon the occurrence of a certain or preselected condition.

More particularly, a relay 23 which is connected in electrical circuit 15, as discussed in detail hereinafter, is provided with an armature or resilient arm having good heat conduction properties and which generally constitutes heat sink 21. Upon energization, relay 23 actuates or attracts arm 21 toward a position disengaged from boiler 3, and in the event of an emergency, such as a loss or interruption of power for instance which may constitute the aforementioned certain condition, the inherent resiliency of arm 21 moves it into engagement with boiler 3, as shown in FIG. 1, thereby to accelerate the cooling rate thereof, i.e. to effect a generally rapid cooling of the boiler, as discussed in greater detail hereinafter.

Referring now in detail to FIG. 1 and in part reviewing the foregoing, thermal actuator 1, in one form of the invention, has means, such as boiler 3, for containing vaporizable fluid 7, and the boiler is adapted to be heated and cooled for effecting displacement flow and return flow of the fluid, respectively. Means, such as PTCR 19, is provided for vaporizing at least a portion of fluid 7 upon the return flow thereof to throttle the volumetric flow rate of the returning fluid.

More particularly, boiler 3 is formed of a metal having relatively great heat conduction or heat transfer characteristics, as is well known in the art, and is provided with a generally annular side wall 24 having an integral top or end wall 26. A closure member, such as a lower wall 27, is connected to annular side wall 24 by suitable means, such as soldering or the like for example, as is well known in the art, and a conduit receiving aperture 29 is provided through the closure member connecting with a fluid fill chamber 31 interiorly of boiler 3. It may be noted that boiler 3 and fluid 7 therein preferably presents a relatively small thermal mass compared to the relatively great cooling capacity or surface area thereof. PTCR 13 is disposed in heat transfer relation with boiler top wall 26, and while the PTCR may be electrically insulated by suitable dielectric material from boiler 3 if desired, the PTCR is disclosed mounted in direct heat conductive association with the top wall of the boiler.

Conduit 9 is formed just large enough to readily allow flow therethrough of fluid 7 and small enough to minimize conduction of heat between boiler 3 and bellows 5. Preferably, conduit 9 is formed of a metal having relatively low thermal conductive characteristics. Conduit 9 has one end extending through closure member aperture of boiler 3 being fixedly and sealably disposed within closure member aperture 29 by suitable means, such as crimping or other suitable sealing and connecting means. Upper end portion 11 of conduit 9 extends into fluid fill chamber 31 of boiler 3 the selected distance D beneath fill level L of the boiler. A lower end or portion of conduit 9 extends through a support or frame 33 for thermal actuator 1 into fixed connection with bellows 5, and the support can also be utilized as a thermal insulator to isolate boiler 3 and bellows 5.

Bellows 3 is provided with a lower end wall 35 for delivering output or working force F to effect or control the operation of a driven or operated device (not shown), as previously mentioned. An annular, expansible resilient member 37 of relatively low positive gradient spring rate is fixedly interposed by suitable means, such as soldering or the like (not shown) between bellows end wall 35 and support 33 about a cup-shaped portion thereof 39 which depends generally coaxially in the expansible member, and expansible chamber 17 is formed within the expansible member between the bellows end wall and the support. An aperture 41 is provided in the support cup-shaped portion 39 in which the lower end of conduit 9 is fixedly and sealably received by suitable means, such as crimping or soldering or the like.

Boiler 3 is illustrated and described herein only for purposes of disclosure, and it is contemplated that other types of boilers may be utilized in thermal actuator 1 within the scope of the inventions without departing from the teachings thereof. For a more detailed discussion of some of the other types of boilers which may be used in thermal actuator 1 in order to effect different speeds of actuations, time delays and the like, reference may be had to copending applications Ser. Nos. 439,894 and 439,895 filed Feb. 6, 1974 and to copending applications Ser. No. 484,282 filed June 28, 1974. These copending applications are specifically incorporated herein by reference.

It may be noted that conduit 9 is provided with a configuration, indicated at 43, which is generally U-shaped and adjacent the mid-portion of the conduit, and such configuration is spaced so as to be thermally insulated from both boiler 3 and bellows 5. A plate 45 of a metal having good thermal conductive properties is disposed generally in heat conductive or exchange association with conduit configuration 43, and PTCR 19 is disposed on the plate in heat exchange or conductive association with the plate. To complete the description of thermal actuator 1, a stand or pedestal support 47 of a material having good thermal insulation properties may, if desired, be positioned on support 33 in supporting engagement with plate 45.

In FIG. 1, there is shown in one form of the invention an actuating system, indicated generally at 49, for thermal actuator 1 having a pair of means, such as boiler 3 and bellows 5, for containing vaporizable fluid 7. In actuating system 49, means, such as PTCR 13, effects heating and cooling of one of the containing means, such as boiler 3, to respectively establish displacement flow of fluid 7 therein to the other of the containing means, such as bellows 5, and return flow therefrom. Means, such as PTCR 19, is provided for vaporizing at least a portion of fluid 7 of the return flow for throttling the volumetric flow rate thereof, as discussed in detail hereinafter.

There is also shown, in FIG. 1 an acutating system indicated generally at 51, in one form of the invention which includes thermal actuator 1 and its means, such as boiler 3, for containing vaporizable fluid 7. In system 51, means, such as PTCR 13, is operable generally between energized and de-energized state for respectively heating and cooling boiler 3, and means, such as heat sink 21, is provided for engagement with the boiler to accelerate cooling thereof upon the occurrence of a certain condition, such as the loss or interruption of power to relay 23, as previously noted and as discussed in detail hereinafter.

Referring now to FIG. 2 in particular, electrical circuit 15 in one form of the invention for operating thermal actuator 1 is provided with means, such as PTCR 13, for heating at least a portion of the thermal actuator, such as boiler 3, and means, such as a thermostat 53 of a type well known in the art, for selectively connecting PTCR 13 in the circuit. Heat sink, such as arm 21, is provided for selective communication, i.e. engagement and disengagement, with boiler 3, and means, such as relay 23, is operable generally in response to interruption of electrical circuit 15 for communicating the arm with boiler 3.

More particularly, electrical circuit 15 is provided with a transformer 55, which may be of the step-down type, connected across a pair of line terminals L1, L2, and the transformer as well as the rest of the electrical circuit is connected to ground at 57 through a safety switch 59. Safety switch 59 may be of a type known to the art having means (not shown) for sensing an over-temperature condition of a device (not shown) to be controlled, and upon the occurrence of such over-temperature condition, the safety switch is operable to open the circuit thereby to take thermal actuator 1 off the line. Both PTCR 13 and PTCR 19 are connected in parallel circuit relation with safety switch 59 and therethrough across the line. Thermostat 53 is connected in series circuit relation with PTCR 13 for selectively energizing and de-energizing it, and PTCR 19 may be continually energized in circuit 15. It is contemplated that PTCR 19 may be controllably energized and de-energized by another thermostat (not shown) connected in series circuit relation therewith, if desired, and such arrangement is contemplated as being within the scope of the invention. Relay 23 is connected in parallel circuit relation with safety switch 59 and therethrough across the line, and as previously noted, relay 23 is operable generally upon de-energization, i.e. when switch 59 opens in the event of a power interruption in circuit 15, to permit movement of its arm 21 into engagement with boiler 3 thereby to provide the heat sink therefor.

OPERATION

In the operation with electrical circuit 15 connected across the line, PTCR 19 is energized and PTCR 13 may be energized by thermostat 53 in response to a certain or preselected condition, such as selected low temperature of the environment which thermal actuator 1 controls. Upon the energization of PTCR 13, heat is conductively transferred therefrom through top and side walls 26, 24 of boiler 3 to fluid 7 therein. When the temperature necessary to effect vaporization of heated fluid 7 is attained, the expansion of the vaporized fluid so created effects a corresponding increase in pressure within boiler 3, and a pressure differential is thereby established between boiler 3 and bellows 5. The increasing pressure of the established vapor in boiler 3 acts on fluid 7 therein forcing or displacing the selected portion thereof in its liquid state through conduit 9 into expansible chamber 17 of bellows 5 thereby to generally equalize the pressure differential between the boiler and the bellows. Of course, the establishment of pressure in bellows 5 acts on the effective area thereof in expansible chamber 17 and effects the output or working force F thereof for driving a driven device (not shown). Upon the displacement of the selected portion of fluid 7 in response to established vapor pressure attained by the heating of boiler 3, the level of the fluid in the boiler is reduced through distance D from predetermined fill level L to a level generally coextensive with upper end portion 11 of conduit 9. At this time, further displacement of fluid 7 in its liquid state through conduit 9 is, of course, obviated. However, further heating of boiler 3 effects vaporization of the remaining fluid 7 in the boiler i.e., the fluid below standpipe upper end portion 11, and the vapor illicited from the remaining fluid is transferred through conduit 9 to bellows 5. In the relatively cooler environs of bellows 5, the vapor is condensed back to the liquid state, as previously discussed, thereby to generally equalize the pressure differential between the boiler and bellows and maintain the bellows filled with fluid. Initially only a predetermined amount of fluid 7 in its liquid state is displaced from boiler 3 to bellows 5, and such initial displacement is rapid and may be utilized to take up slack or the like in system 49 and initially effect actuation thereof. Subsequent thereto, only vapor vaporized from the remaining fluid 7 in boiler 3 is transferred therefrom to bellows 5 at a relatively slower and more controlled rate due to the latent heat of evaporation of the fluid vaporized for effecting actuation of system 49. Therefore, the rate of displacement of the predetermined amount of fluid 7 in its liquid state is greater than the rate of transfer of the vapor from boiler 3 to bellows 5. The time necessary to actuate thermal actuator 1 may, of course be varied by changing fill level L of fluid 7 in boiler 3 and by using other types of boilers, as previously mentioned.

When another certain or predetermined condition occurs, such as a predetermined high temperature in the environs controlled by thermal actuator 1, it is sensed by thermostat 53 which acts to open circuit 15 to PTCR 13 effecting deenergization thereof to terminate the heating cycle of boiler 3 and initiate the cooling cycle thereof. As boiler 3 begins to cool, a slight amount of vapor therein condenses which results in a slight decrease in pressure in the boiler thereby to effect a pressure differential between the boiler and bellows 5. In response to this pressure differential, a return flow of relatively cooler fluid 7 in its liquid state is established from bellows 5 toward boiler 3 through conduit 9 in an attempt to equalize the pressure therebetween. However, as fluid 7 in its liquid state returns from bellows 5 through conduit 9, PTCR 19 is effective to transfer heat through plate 45 and the conduit for heating the returning fluid to a temperature great enough to effect vaporization of at least a portion of the returning fluid. Vaporized fluid 7 thereafter flows back to the now cooling boiler 3 where the latent heat of evaporation of the vaporized fluid is surrendered or transmitted to the boiler thereby to slow or delay the cooling rate thereof. Of course, the vaporization of returning fluid 7 is effective to throttle or reduce the volumetric flow rate of the returning fluid since a lesser amount or volume of fluid can be transferred in its vapor state than in its liquid state. Therefore, it may be noted that the throttling action of PTCR 19 in its vaporization of returning fluid 7 reduces the rate of returning fluid thereby to effect a predetermined time delay in the cooling rate of boiler 3 as well as a predetermined time delay in the resetting of off period of thermal actuator 1. In other words, vaporization of returning fluid 7 and the surrendering of its latent heat of evaporation to boiler 3, in effect, serves as a heat source to reheat the cooling boiler. Such reheating slows the cooling rate of boiler 3 preventing rapid cooling thereof and also serves to generally maintain the pressure differential between boiler 3 and bellows 5 at a minimum value thereby reducing the rate of return flow of fluid 7. It may be noted that the pressure differential between boiler 3 and bellows 5 effecting the return flow of fluid 7 is generally proportional to the cooling rate of the boiler and also that the volumetric flow rate of the returning fluid is generally proportional to the cooling rate of the boiler. As the condensation of returning fluid 7 in its vaporized state continues in boiler 3, the pressure differential and output force F are correspondingly reduced and eventually eliminated.

In event of interruptions of electrical circuit 15 affecting the delivery of power to PTCR 13, PTCR 19 and relay 23, it is desirable to eliminate all of the electrical loads controlled by the thermal actuator so that power may be more easily restored. In this vien, relay 23 is tripped or de-energized upon the interruption of power supplied thereto. Upon the de-energization of relay 23, the resiliency of arm 21 effects the movement thereof from its relay energized position disassociated from boiler 3 of thermal actuator 1 toward its relay de-energized position into heat conductive association or engagement with the boiler. In this manner, arm 21 in heat conductive engagement with boiler 3 acts as a heat sink for the boiler thereby to accelerate the cooling rate thereof for effecting rapid cooling under a certain or emergency condition when power is interrupted. Of course, rapid cooling of thermal actuator 1 acts to take off the line any electrical devices the thermal actuator may be driving, and both PTCR 13 and PTCR 19 are de-energized thus also effecting rapid return flow of fluid 7 in its liquid state to boiler 3 to contribute to a relatively fast reset.

In the event of another certain or emergency condition in electrical circuit 15, such as an over heating condition, safety switch 59 is provided with a means (not shown) for sensing such over heating conditions and the safety switch is automatically actuated in response to the sensed overheating condition to open circuit 15 across line terminals L1, L2 thereby to de-energize all of the components of the circuit. Of course, when safety switch 59 is so actuated, relay 23 is de-energized to effect the connection of thermal actuator boiler 3 with its heat sink or arm 21, as previously described. When the emergency condition causing the overheating has been alleviated, safety switch 15 may be restored to its position connecting circuit 15 across line terminals L1, L2 so that operations of the circuit components can resume.

From the foregoing, it is now apparent that a novel thermal actuator 1, novel methods of operating a thermal actuator, novel actuating systems 49, 51 for a thermal actuator, and a novel electrical circuit 15 for operating a thermal actuator are provided meeting the objects and advantageous features set out hereinbefore, as well as others. It is contemplated that changes as to the precise configurations, shapes, connections and details of the structures and also as to the precise steps of the methods, which are presented merely to illustrate the invention, may be made by those having ordinary skill in the art without departing from the spirit and scope of the invention as set out by the claims which follow.

What I claim as new and desire to secure by Letters Patent of the United States of America is:

1. A method of operating a thermal actuator having a pair of means for containing a vaporizable fluid comprising the steps of:
   a. controlling heating and cooling of one of the containing means for respectively effecting transfer of fluid therein to the other of the containing means and the return therefrom of fluid to the one containing means; and
   b. vaporizing at least a portion of the fluid during its return to the one containing means for throttling the volumetric flow rate thereof.

2. The method as set forth in claim 1, comprising the additional step of surrendering the latent heat of evaporation of the fluid vaporized during its return to the one containing means for slowing the cooling rate thereof.

3. The method as set forth in claim 2, wherein the surrendering step includes maintaining a pressure differential between the containing means generally at a low value proportional to the cooling rate of the one containing means.

4. The method as set forth in claim 2, wherein the volumetric flow rate of the fluid returning to the one containing means is also generally proportional to the cooling rate thereof.

5. The method as set forth in claim 1, comprising the preliminary step of disposing means for carrying the flow of the fluid between the containing means, and associating means for heating the fluid to its vaporizing temperature in thermal transferring relation with the carrying means.

6. The method as set forth in claim 5, wherein the heating means is a PTCR.

7. The method as set forth in claim 1, comprising the additional step of communicating the one containing means with means for effecting rapid cooling thereof upon the occurrence of a certain condition.

8. The method as set forth in claim 1, comprising the preliminary step of interconnecting means for transferring the fluid between the containing means.

9. The method as set forth in claim 8, wherein the preliminary step also includes the step of disposing a pair of means adapted to be electrically energized in heat transfer association with the one containing means and the transferring means for heating the fluid therein, respectively.

10. The method as set forth in claim 9, wherein the preliminary step further includes connecting the heating means in an electrical circuit having means for interrupting the electrical circuit to at least one of the heating means upon the occurrence of a certain condition.

11. The method as set forth in claim 1, comprising the preliminary step of connecting in an electrical circuit means actuated in response to the interruption of the electrical circuit for effecting rapid cooling of the one containing means.

12. A method of operating a thermal actuator having means therein for containing a vaporizable fluid comprising the steps of:
 a. heating and cooling the containing means for effecting the operation of the thermal actuator; and
 b. communicating means for accelerating the cooling of the containing means with it upon the occurrence of a certain condition.

13. The method as set forth in claim 12, wherein the accelerating means generally constitutes a heat sink.

14. The method as set forth in claim 12, comprising the preliminary step of connecting in an electrical circuit means adapted to be actuated for communicating the accelerating means and the containing means upon the occurrence of the certain condition.

15. A thermal actuator comprising a pair of means for containing a vaporizable fluid, means associated with one of the containing means and operable generally between energized and de-energized states for creating pressure differentials between the containing means to establish flows of the fluid in opposite directions therebetween upon the occurrence of certain conditions, respectively, and means for vaporizing at least a portion of the fluid as it flows from the other of the containing means toward the one containing means when the creating means is in its de-energized state.

16. A thermal actuator as set forth in claim 15, wherein the vaporizing means comprises means for heating the fluid to a temperature effecting its vaporization.

17. A thermal actuator as set forth in claim 15, further comprising means communicating between the containing means for transferring the fluid therebetween.

18. A thermal actuator as set forth in claim 17, wherein the vaporizing means comprises means disposed in heat transfer relation with the transferring means for heating the fluid to its vaporizing temperature.

19. A thermal actuator as set forth in claim 15, further comprising means for communication with the one containing means to effect rapid cooling thereof upon the occurrence of a certain other condition.

20. A thermal actuator as set forth in claim 15, wherein the fluid vaporized by the vaporizing means surrenders at least some of its heat to the cooling one containing means for slowing the cooling rate thereof.

21. A thermal actuator as set forth in claim 15, wherein the vaporization of the fluid throttles the volumetric flow rate thereof.

22. A thermal actuator as set forth in claim 20, wherein the heat surrendered by the vaporized fluid to the one containing means maintains the pressure differential between the containing means generally at a low value and generally proportional to the cooling rate thereof.

23. An actuating system comprising a thermal actuator having means for containing a vaporizable fluid, means operable generally between energized and de-energized states for respectively effecting heating and cooling of the containing means, and means for engagement with the containing means to accelerate the cooling thereof upon the occurrence of a certain condition.

24. An actuating system as set forth in claim 23, wherein the engagement means generally constitutes a heat sink.

25. An actuating system as set forth in claim 23, wherein the engagement means comprises means for thermal conductive association with the containing means.

26. An actuating system as set forth in claim 25, wherein the engagement means further comprises means operable generally for effecting movement of the thermal conductive means into engagement with the containing means upon the occurrence of the certain condition.

27. An actuating system as set forth in claim 26, further comprising an electrical circuit, the movement effecting means being connected in the circuit, and interruption of the electrical circuit constituting the certain condition.

28. An actuating system comprising a thermal actuator having a pair of means for containing a vaporizable fluid, a device operably associated for actuation with one of the containing means, means for effecting heating and cooling of the other of the containing means to respectively establish displacement flow of the fluid therein to the one containing means to effect the actuation of the device and return flow of the fluid from the one containing means to effect the de-actuation of the device, and means for vaporizing at least a portion of the fluid during the return flow to throttle the volumetric rate thereof and delay the de-actuation of the device.

29. An actuating system as set forth in claim 28, wherein the vaporized fluid surrenders its heat to the other containing means for slowing the cooling rate thereof.

30. An actuating system as set forth in claim 29, wherein the volumetric flow rate of the fluid returning to the other containing means is proportional to the cooling rate thereof.

31. An actuating system as set forth in claim 28, wherein the vaporizing means comprises means associated with a portion of the thermal actuator for heating the return flow of fluid to a temperature effecting its vaporization.

32. An actuating system as set forth in claim 28, further comprising means for transferring the displacement flow and the return flow of fluid between the containing means.

33. An actuating system as set forth in claim 32, wherein the vaporizing means is generally constituted by means thermally coupled with the transferring means for heating the at least the portion of a fluid to effect the vaporization thereof during its return flow through the transferring means.

34. An actuating system as set forth in claim 28, further comprising means for engagement with the other containing means for accelerating its cooling upon the occurrence of a certain condition.

35. An actuating system as set forth in claim 28, wherein both the vaporizing means and the heating and cooling effecting means are adapted to be electrically energized, and means connected in electrical circuit relation with both the vaporizing means and the heating and cooling effecting means for interrupting the supply of power thereto.

36. In an electrical circuit for operating a thermal actuator, means for heating at least a portion of the thermal actuator, means for selectively connecting the heating means in the circuit; the combination therewith comprising a heat sink, and means operable generally in response to interruption of the circuit for communicating the heat sink and the thermal actuator portion.

37. A thermal actuator comprising means for containing a vaporizable fluid, the containing means being adapted to be heated and cooled for effecting displacement flow and return of the fluid, respectively, and means for vaporizing at least a portion of the fluid during the return flow thereof to throttle the volumetric flow rate of the returning fluid.

38. A thermal actuator as set forth in claim 37, wherein the vaporized fluid surrenders its latent heat of evaporation to the containing means for slowing its cooling rate when the vaporized fluid returns to the containing means.

39. A thermal actuator as set forth in claim 37, wherein the vaporizing means comprises means for heating the fluid to its vaporizing temperature.

40. A thermal actuator as set forth in claim 39, wherein the heating means includes a PTCR in association with at least a portion of the thermal actuator through which the fluid returns to the containing means.

41. A thermal actuator as set forth in claim 37, further comprising means operable generally upon the occurrence of a certain condition for accelerating the cooling of the containing means.

42. A thermal actuator as set forth in claim 37, further comprising means for communicating the containing means with a heat sink upon the occurrence of a certain condition.

43. A thermal actuator comprising a boiler, a chamber in the boiler adapted to contain a vaporizable fluid, means for performing work includiing a bellows having an expansible chamber therein adapted to be generally filled with the fluid, and a wall on the bellows responsive to the pressure of the fluid in the expansible chamber to effect the performance of the work, a conduit connected between the boiler and the bellows for communicating the first named chamber and the expansible chamber, means operable generally between energized and de-energized states for effecting heating and cooling of the boiler relative to the bellows thereby to create pressure differentials in opposite directions between the first named chamber and the expansible chamber, respectively, the pressure differential in one of the opposite directions initially created upon the heating of the boiler being effective to establish a displacement flow of at least a part of the fluid from the boiler through the conduit to the expansible chamber increasing the pressure of the fluid therein to effect the work performance of the bellows wall and thereafter the pressure differential in the other of the opposite directions created upon the subsequent cooling of the boiler being effective to establish a return flow of the fluid from the bellows through the conduit toward the boiler reducing the pressure of the fluid in the expansible chamber to terminate the work performance of the bellows wall, and means disposed in heat transfer relation with the conduit for vaporizing at least a part of the fluid during its return flow to throttle the volumetric flow rate thereof and thereby delay the reduction of the pressure of the fluid in the expansible chamber and the termination of the work performance of the bellows wall.

44. A thermal actuator comprising a pair of means for containing a vaporizable fluid, means for communicating the containing means, means operable generally for heating one of the containing means to establish a displacement flow of at least a part of the fluid therefrom through the communicating means toward the other of the containing means and the heating means being operable to thereafter at least reduce the heating of the one containing means relative to the other containing means to establish a return flow of fluid from the other containing means through the communicating means toward the one containing means, and means disposed in thermal transfer relation with the communicating means for vaporizing at least a part of the return flow of the fluid therethrough to throttle the volumetric flow rate of the return flow of the fluid.

45. A thermal actuator comprising a pair of means for containing a vaporizable fluid, means connected between the containing means for conducting a displacement flow of the fluid from one of the containing means to the other of the containing means and a return flow of the fluid therebetween, means for effecting heating of the one containing means to create a pressure differential between the containing means operable generally to establish the displacement flow of the fluid and for thereafter effecting cooling of the one containing means to create an oppositely acting pressure differential between the containing means operable generally to establish the return flow of the fluid, and means associated with the conducting means for vaporizing at least a part of the return flow of the fluid therethrough.

46. A thermal actuator comprising a pair of means for containing a vaporizable fluid, means for communicating the containing means, means associated with one of the containing means and operable generally between energized and non-energized states for respectively controlling heating and cooling of the one containing means relative to the other of the containing means, the controlling means being operable generally in its energized state to heat the one containing means to establish a pressure differential between the containing means and thereby effect a displacement flow of at least a part of the fluid from the one containing means through the communicating means toward the other containing means and the controlling means in its de-energized state permitting the cooling of the one containing means relative to the other containing means to establish another pressure differential between the containing means and thereby effect a return flow of fluid from the other containing means through the communicating means toward the one containing means, and means associated with the communicating means for vaporizing at least a part of the returning fluid during its return flow through the communicating means so that the latent heat of evaporation of the vaporized at least part of the returning fluid may be surrendered to the one cooling means to slow its cooling rate thereby to maintain the other pressure differential generally at a low value proportional to the cooling rate of the one containing means.

47. A method of operating a thermal actuator having a pair of means for containing a vaporizable fluid comprising the steps of:
  a. heating one of the containing means to create a pressusre differential between the containing means and establish displacement flow of at least a portion of the fluid toward the other of the containing means;
  b. permitting the one containing means to cool relative to the other containing means to create another pressure differential between the containing means and establish a return flow of the fluid from the other containing means toward the one containing means; and
  c. vaporizing at least a part of the fluid during its return flow and surrendering at least a part of its latent heat of evaporation to the one containing means to slow the cooling rate thereof.

* * * * *